Nov. 17, 1970 — D. C. ENGELBART — 3,541,541
X-Y POSITION INDICATOR FOR A DISPLAY SYSTEM
Filed June 21, 1967 — 3 Sheets-Sheet 1

INVENTOR.
DOUGLAS C. ENGELBART
BY Lindenberg + Freilich
ATTORNEYS

Nov. 17, 1970  D. C. ENGELBART  3,541,541
X-Y POSITION INDICATOR FOR A DISPLAY SYSTEM
Filed June 21, 1967  3 Sheets-Sheet 2
FIG. 4
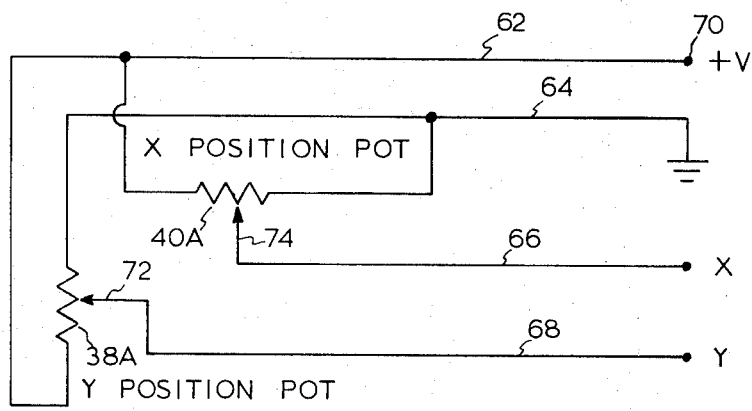
FIG. 5
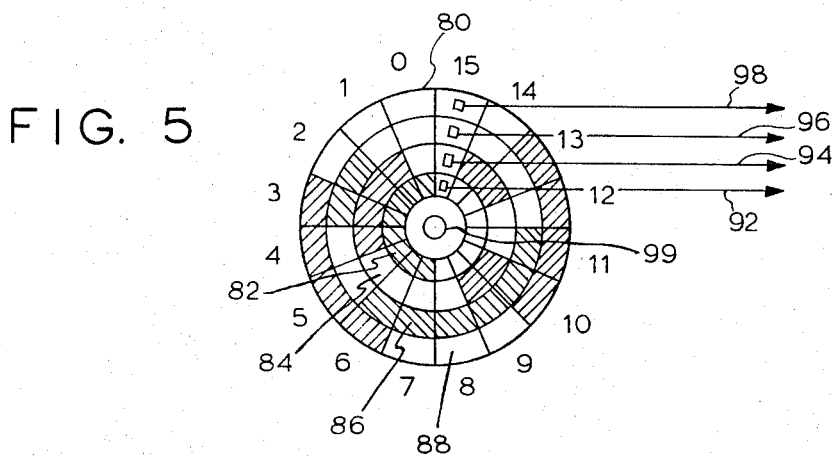
FIG. 6
INVENTOR.
DOUGLAS C. ENGELBART
BY
Lindenberg & Freilich
ATTORNEYS

United States Patent Office 3,541,541
Patented Nov. 17, 1970

3,541,541
X-Y POSITION INDICATOR FOR A DISPLAY SYSTEM
Douglas C. Engelbart, Palo Alto, Calif., assignor to Stanford Research Institute, Menlo Park, Calif., a corporation of California
Filed June 21, 1967, Ser. No. 647,872
Int. Cl. H01j 29/70
U.S. Cl. 340—324          8 Claims

ABSTRACT OF THE DISCLOSURE

An X-Y position indicator control for movement by the hand over any surface to move a cursor over the display on a cathode ray tube, the indicator control generating signals indicating its position to cause a cursor to be displayed on the tube at the corresponding position. The indicator control mechanism contains X and Y position wheels mounted perpendicular to each other, which rotate according to the X and Y movements of the mechanism, and which operate rheostats to send signals along a wire to a computer which controls the CRT display.

BACKGROUND OF THE INVENTION

This invention relates to visual display systems and, more particularly, to devices for altering the display at selected locations.

One of the potentially most promising means for delivering and receiving information to and from digital computers involves the display of computer outputs as visual representations on a cathode ray tube and the alteration of the display by a human operator in order to deliver instructions to the computer. In order for a human operator to readily change the displayed pattern, he must be provided with means for accurately indicating the exact position on the visual display at which he can make alterations. Devices are known which enable accurate position location on the tube display, such as a light pencil detector which is held against the tube while the entire tube is swept by the beam, the instant at which light is detected during the time required to sweep the entire face indicating the detector's position.

A disadvantage of the light pencil and other similar devices is that they generally require the human operator to hold the pencil against the CRT with one hand while changes are made. Consequently, the operator does not have both hands free to enter changes, as by typing them in, and cannot move to equipment only a step away from the CRT. Furthermore, the light pencil often covers part of the area of the CRT display where changes are to be entered, which interferes with the process.

SUMMARY OF THE INVENTION

One subject of the invention is to provide an X-Y position indicating control mechanism for controlling indications of positions on a cathode ray tube (CRT) display, by movement along a surface which can be other than the face of the CRT.

Another object of the invention is to provide a position indicator control which transmits signals defining its position on a surface, and which is connected by only a cable to the apparatus which acts upon such information.

Still another object of the invention is to provide a simple and improved X-Y position locating device.

The foregoing and other objects are realized by an X-Y position indicator control mechanism comprising a small housing adapted to be held in the hand and having two wheels and an idler ball bearing for contacting the surface on which it rests. The two wheels are mounted with their axes perpendicular to each other and each wheel is attached to a potentiometer or other means for indicating its rotation. The position indicator control is held by the hand and moved over any surface, such as a desk top (or even may be moved by the feet). As the indicator control is moved, the two wheels rotate and the resistance of the potentiometer changes. Electrical leads connected to the potentiometers trail behind the indicator control and connect to a computer which continuously monitors the indicator control's position. The computer causes the CRT to display a symbol, or cursor, such as a short line on the CRT screen to define a position on the screen about which changes or the like may be made, the cursor position changing in accordance with movement of the X-Y position indicator control. Buttons are provided on the indicator control housing for closing switches to send pulses through additional wires trailing behind the indicator control to signal for a change in the displayed information. For example, one button on the indicator control may be used to cause the erasure of a small area directly above or following the cursor. New material may then be inserted in place of the material erased in accordance with the programming of the computer, as by typing in letters.

While a potentiometer may be connected to each of the two wheels on the indicator control, other devices can be used for generating signals indicating rotation of the wheels. One such device is a shaft position encoder which produces a digita output corresponding to the angular position of the wheel. While such an arrangement provides a direct digital output, instead of an analog output which must be digitally converted to be used by the computer control in the CRT display, the output from a shaft encoder necessitates a large cable. Still another means for indicating position of a wheel is an incremental encoder and counter. An incremental encoder generates an up indicating pulse each time the shaft moves by a certain increment of rotation in one directon and generates a down indicating pulse when the shaft moves in the other direction. These pulses are transmitted to an up-down counter, which provides a digital output equal to the sums of the up inputs minus the sum of the down inputs.

BRIEF DESCRIPTION OF THE DRAWINGS

FIG. 4 is a simplified schematic diagram of an electrical circuit for connection to a position indicating control mechanism of the invention;

FIG. 5 is a schematic diagram of another embodiment of an electrical circuit for use in the invention, wherein a shaft encoder is used;

FIG. 6 is still another embodiment of an electrical circuit for use in the invention, utilizing an incremental encoder.

DESCRIPTION OF THE PREFERRED EMBODIMENTS

Figure 1:
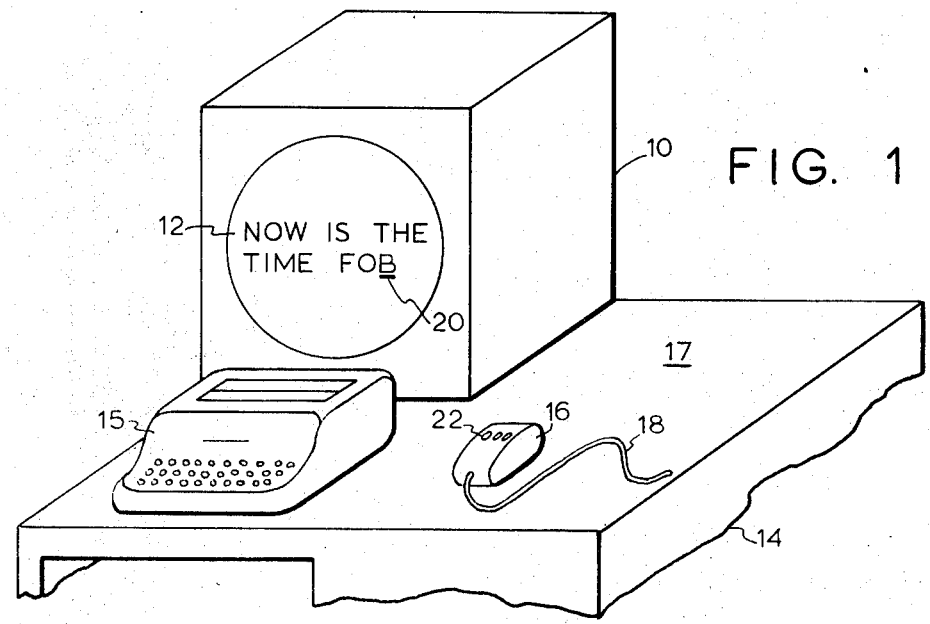
FIG. 1 is a pictorial illustration of a display system in accordance with the invention.

FIG. 1 shows a display system constructed in accordance with the invention, comprising a cathode ray tube display 10 for creating visual patterns on the face 12 of a cathode ray tube, a computer system 14 including a typewriter input apparatus 15 which generates signals that define the patterns displayed by the CRT display system, and an X-Y position indicator control 16. The position indicator control 16 is positioned on the top of the cabinet 17 of the computer, although it can be positioned on any other surface. The indicator control 16 has wheels which support it on the cabinet and which register changes in the position thereon. A wire 18 connects the position indicator control to the computer 14 for transmitting signals indicating the position of the indicator control. The computer 14, which controls the pattern on the CRT face 12, generates signals causing the display of a line or other cursor 20 on the CRT. The position of the cursor 20 is governed by the position of the indicator control 16 determined by the computer 14 in accordance with the signals it receives from the indicator control over the wire 18.

Three buttons 22 are located on the indicator control 16 for operating switches within the indicator control to allow currents to flow through conductors of the wire 18. The switches may be used to cause changes in particular areas of the display, or for other purposes. For example, one of the buttons may be used to control the delivery of signals which command the computer 14 to operate on the portion of the pattern displayed immediately above the cursor 20, such as a single character, the particular operation being designated by inputs to the typewriter apparatus 15. Another button may be used to command the operations to be performed on the entire line of characters immediately above and to the right of the cursor 20. An operation such as "erase" may be designated by pressing a particular key on the typewriter, to cause the computer to stop the display of characters at those areas. New characters can be inserted into the display by leaving the position indicator control 16 stationary so the cursor does not move and then typing in the new characters on the typewriter 15.

Figure 2:
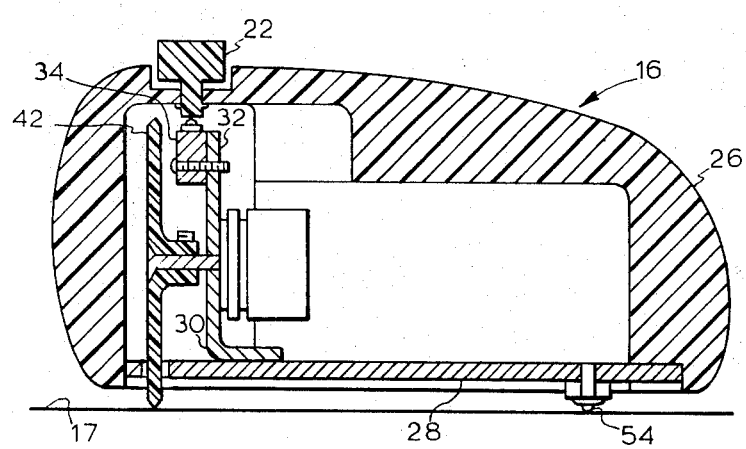
FIG. 2 is a sectional elevation view of the position indicating control mechanism of the invention.
Figure 3:
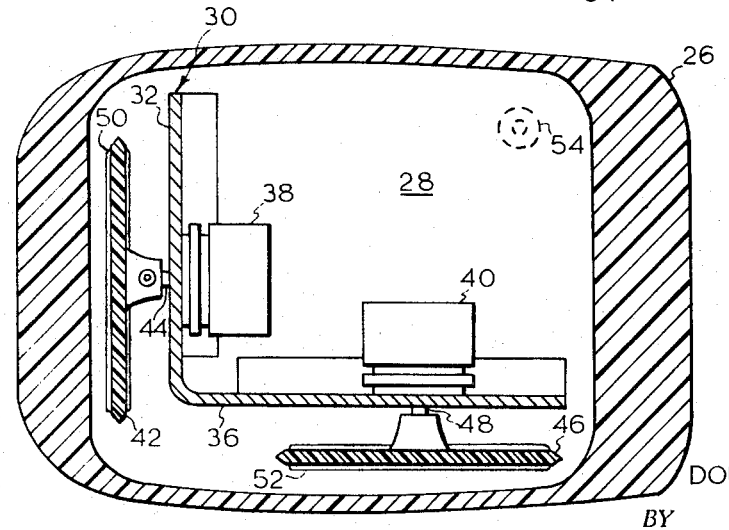
FIG. 3 is a sectional plan view of the mechanism of FIG. 2.

The position indicator control 16 is shown more clearly in the sectional side view of FIG. 2 and the sectional plan view of FIG. 3. A housing 26 has a bottom wall 28 on which is attached a right angle bracket 30. One arm 32 of the bracket holds three pushbutton switches 34 which close circuits that cause changes in the cathode ray tube display. The pushbuttons 22 are slideably mounted in the housing 26, for movement against the switches 34 to close them.

Each arm 32 and 36 of the bracket 30 holds a potentiometer, the arm 32 holding an X position potentiometer 38 and the arm 36 holding a Y position potentiometer 40. An X position wheel 42 is fixed to a shaft 44 of the potentiometer 38, while a Y position wheel 46 is fixed to a shaft 48 of the Y position potentiometer 40. Each of the position wheels 42 and 46 project through slots 50 and 52, respectively, formed in the bottom wall 28. A ball bearing support 54 fixed to the underside of the bottom wall 28 serves as a third point of support, in addition to the two wheels 42 and 46, to stably support the indicator control on the cabinet 17 or other surface.

When the position indicator control is moved over the cabinet 17, or any other surface, the X and Y position wheels rotate. Inasmuch as the X and Y position wheels 42 and 46 are mounted on axes that are perpendicular to each other, the X position wheel 42 rotates by an amount equal to the movement in one direction which may be defined as the X direction, while the Y position wheel 46 rotates an amount equal to the movement in a perpendicular or Y direction. As the wheels move, the shafts of their respective potentiometers rotate, and the resistance of the potentiometers enable continuous measurement of the resistance, and therefore of the X and Y positions of the indicator control 16. It may be noted that in most cases multiturn potentiometers are used to enable monitoring of large movements of the indicator control, or conversely, to enable fine control.

The position indicator control may be utilized by first placing it on the cabinet 17 and moving it up or down and back or forth to cause corresponding movements in the apparent position of the cursor 20, until the cursor lies in a desired position. The indicator control remains stationary so long as it is left in place; therefore the cursor 20 remains fixed without any effort of the human operator. If it is desired to move the cursor 20, the position indicator control 16 is moved in directions corresponding to the desired movements of the cursor. The resistances of the rheostats, sensed through the conductors contained in the wire 18, continually monitor the position of the indicator control and cause movement of the line cursor 20 accordingly.

FIG. 4 is a simplified schematic diagram of the electrical circuit by which the position of the indicator control 16 is monitored. Electrical conductors 62, 64, 66 and 68 represent separate leads contained in the wire 18 connecting the indicator control to the computer. A voltage +V is connected at terminal 70 for sending currents through the two rheostats or potentiometers whose resistances are indicated at 38A and 40A. One side of each potentiometer is connected to lead 64, which is grounded. The wipers 72 and 74 of the potentiometers are connected to leads 68 and 66, respectively, which in turn are connected to terminals Y and X. By noting the voltage at X and Y, relative to ground potential, the resistances of the two potentiometers and therefore the X and Y positions of the indicator control are known.

Figure 7:
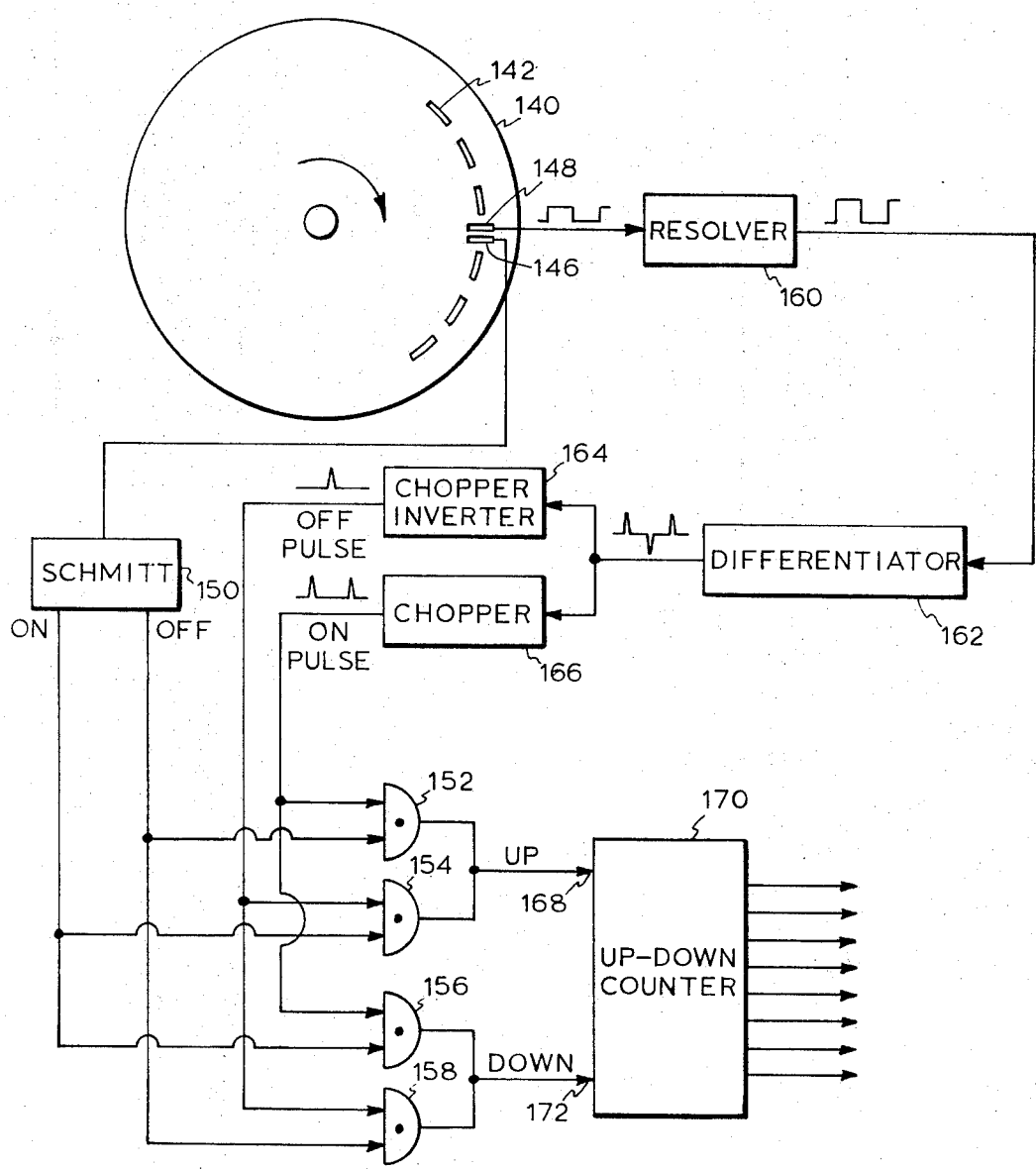
FIG. 7 is a schematic diagram of another circuit for use in the invention, which also employs an incremental encoder.

The indications of X and Y position given by the voltages at terminals X and Y are presented in analog form. A digital computer requires digital inputs and therefore, an analog-to-digital converter must be used between the X and Y terminals and the computer inputs. Two types of digital output devices for use with the indicator control are shown in FIGS. 5, 6 and 7.

FIG. 5 shows a position indication control circuit which provides a digital output. An encoding disc 80 is shown which is used to indicate the X position. The disc 80, which is a simplified illustration of the type of disc which is used in practice, is divided into four rings 82, 84, 86 and 88. The disc 80 is also divided into sixteen sectors, each indicated by a number 0 through 15. Four electrical contacts connected to wires 92, 94, 96 and 98, provide readouts. Each of the sixteen sectors of each of the four rings of the disc 80, can be coated with either conductive material or insulative material. The contacts connected to the four output wires 92 through 98 remain stationary while the disc 80, attached to the X position wheel shaft 99, rotates, Currents flow through the disc and through those wires 92 through 98 which are over a conductive portion of the disc, to indicate position.

In order to indicate many positions, the disc 80 is, in practice divided into a large number of rings and sectors, so that a large number of positions can be indicated and small changes of position are registered. A similar scheme is used for the Y position. The advantage of the readout scheme of FIG. 6 is that a digital output is provided which completely defines the position of the indicator at every instant. A major disadvantage is that a large number of wires must be connected to the position indicator control so that a relatively thick cable trails behind it and limits the ease with which it can be moved.

FIG. 6 illustrates still another position readout means, which possesses the advantage of digital output while requiring a minimum number of leads connecting the position indicator control to the computer. In the readout circuit of FIG. 5, a disc 100 is provided which has three rows of electrical contacts, designated 102, 104 and 106. The disc 100 has its axes fixed to the X wheel of the device shown in FIGS. 1, 2 and 3 in place of the potentiometer. The device of FIG. 6 operates by transmitting "up" pulses when the position indicator control moves to the right and "down" pulses when the position indicator control moves to the left. A counter circuit, which is fixed to the computer adds the up pulses and subtracts the down pulses to provide a continuous digital indication of the position of the position indicator control. A similar arrangement is used for the Y position.

In the circuit of FIG. 6 three sensors 108, 110 and 112 are located adjacent to the rows of contacts 102, 104 and 106, respectively. Whenever the disc 100 rotates and one of the contacts of one of the three rows comes under a sensor, a voltage is delivered over one of the lines 114, 116 or 118, leading to circuitry located at the computer. The contacts on the three rows 102, 104 and 106 are located so that only one contact is under a sensor at any given time.

The lines 114, 116, and 118 trail behind the position indicator control and lead to flip-flop 120, OR gate 122 and AND gates 124 and 126, as shown. The outputs of the two AND gates 124 and 126 lead to counter 128 to cause it to count up or down. The counter 128 has numerous output lines over which it continuously transmits signals indicating in a digital manner, the position of the position indicator control.

When the disc 100 of FIG. 6 rotates and a contact of row 104 comes under readying sensor 110, a signal is transmitted over line 116 to set the RS flip-flop 120. If the disc is rotating in a forward or clockwise direction the next contact of the three rows to come under a sensor is a contact of up row 102. When a contact 102 touches sensor 108, a signal is transmitted over up line 114 to AND gate 124. Inasmuch as the flip-flop 120 has been set, a voltage is being received at input 130 of gate 124, and the additional signal at input 132 of gate 124 causes it to generate a pulse. The pulse from gate 124 enters counter 128 at its up input, causing the counter to count up by one digit. The signal over up line 114 also enters OR gate 122 which leads to delay line 124 which, in turn, leads to the reset input of flip-flop 120. A delay of delay line 124 is very short so that flip-flop 120 is reset an instant after an up pulse is registered by the counter.

If the disc 100 continues to turn clockwise after an up pulse is registered, then a contact of row 106 comes under down sensor 112 and causes it to deliver a signal over down line 118 to the AND gate 126. The AND gate 126 will not deliver a pulse because its input 134 from the flip-flop 120 has no voltage on it, due to the fact that the flip-flop 120 has been reset. Only after another signal is transmitted over line 116 to again set the flip-flop 120, will a pulse from up line 114 cause the registation of another up count. Down counting occurs in a similar manner when the disc 100 turns in a counter clockwise direction.

The circuit of FIG. 6 requires only four leads between the computer and the position indicator control. The four leads are the lines 114, 116, 118, and an additional line (not shown) for connection to a voltage source to provide pulses that flow through the sensors to the other three lines.

FIG. 7 illustrates another position readout means of the incremental encoder type, similar to that of FIG. 6. The circuit of FIG. 7 utilizes a simpler encoding disc and one fewer lead, although it involves more complex electronics. In the circuit of FIG. 7, a disc 140 whose axis is connected to a position wheel such as the X position wheel is provided which has a track 142 having spaced conductive segments. A control contact 146 and stepping contact 148 are disposed over the track to make contact with the conductive segments thereof. The contacts are arranged for contacting the segments at angular positions of the disc which overlap. A lead (not shown) connected to the disc 140 conducts currents to the segments of the two tracks.

The contact 146 is connected to a Schmidt trigger circuit 150 which provides currents to two of four AND gates 152, 154, 156 and 158, at a time. The other contact 148 carries current to a resolver 160 of the Schmidt trigger, on-off type, which provides signals with sharp, standard on-off wavefronts. The output of the resolver is delivered to a differentiator 162 which delivers sharp pulses to an inverter chopper 164 and a normal chopper 166. The outputs of each chopper are delivered to two of the AND gates. The outputs of two of the AND gates deliver pulses to the up input port 168 of an up/down counter 170 while the outputs of two other AND gates are delivered to the down input port 172 of the counter. The counter 170 continuously delivers digital output signals defining the position of disc 140.

While the position indicator control can be used merely to cause a change in cursor position, and other means such as a typewriter can be used for adding to the pattern, the indicator control can be used in other ways. For example, the position indicator control can be placed on a drawing to be displayed on the CRT, and then the indicator control can be moved to trace the lines of the drawing with the computer causing corresponding lines to be displayed on the CRT. For such uses, the wheels and electrical signal generators of the indicator control should cause cursor movements which very closely correspond to indicator control housing movements.

The particular mechanical construction shown in FIGS. 2 and 3 are especially well adapted for maintaining accuracy of output and ease of use. The use of only three points of contact, comprising the two wheels and the ball bearing support, help to assure that both wheels will constantly remain in firm contact with the surface on which the position indicator control rests. The location of the various buttons for indicating areas of the display to be operated on, or for other purposes, on the indicator which is moved by the hand allows a human operator to maintain control over both position of changes and the type of changes on the display with only one hand. The use of an indicator control which rests firmly on a surface enables the operator to accurately maintain position with a minimum of muscle effort, since the indicator control remains stationary unless some force is applied to it. The use of relatively large position wheels having appreciable, even if small, moments of inertia, reduces jittering of the indicator control and promotes smooth movement which is helpful in accurate positioning where the displayed characters are small or where accurate tracing of a pattern is required.

While particular embodiments of the invention have been illustrated and described, it should be understood that many modifications and variations may be resorted to by those skilled in the art, and the scope of the invention is limited only by a just interpretation of the following claims.

I claim:

1. In a display system controlled by a computer whereby the display is alterable in accordance with signals delivered to said computer which indicate positions on said display and changes desired to be made therein, the improvement in a position indicating control apparatus which is movable over a surface to provide position indications corresponding to positions on said display comprising:

a housing;

a first position wheel rotatably mounted on said housing and having a rim portion extending past the boundaries defined by said housing for supporting said housing on said surface;

a second position wheel rotatably mounted on said housing with its axis of rotation oriented perpendicular to the axis of said first wheel, said second position wheel having a rim portion extending past said housing for supporting said housing on said surface;

transducer means connected to each of said first and second wheels, for generating digital position indicating signals indicating the degree of rotation of said wheels; and flexible conductor means for connecting said transducer means to said computer, for conducting said position indicating signals to said computer while enabling unrestrained movement of said housing relative to said computer.

2. The improvement in a position indicating control apparatus as defined in claim 1 wherein:

said transducer means comprises an incremental encoder connected to said first position wheel and said flexible conductor means for generating first pulses at each predetermined increment of rotation of said first position wheel in a first direction and for generating second pulses at each increment of rotation of said first position wheel in the opposite direction; and including:

counter means connected to said flexible conductor means, for generating a digital count indicating the net rotation of said first position wheel.

3. The improvement in a position indicating control apparatus as defined in claim 2 wherein said incremental encoder comprises:

a disc connected to said first position wheel having track means, said track means having a plurality of spaced conductor segments;

a control contact and a stepping contact disposed along said track means, said control and stepping contacts positioned for the electrical connection of only one of said contacts with said segments at first predetermined angular positions of said disc and for the simultaneous electrical connection of both of said contacts with said segments at second predetermined angular positions of said disc; and logic means connected to said control and stepping contacts for generating said first pulses when said stepping contact makes a first direction of transition between electrical connection with one of said segments and lack of electrical connection with one of said segments at the same time that said control contact is in a first predetermined state of electrical connection with one of said segments and for generating said second pulses.

4. The improvement of a position indicating control apparatus as defined in claim 1 wherein:

said transducer means comprises a shaft position encoder having a plurality of outputs and said conductor means comprises a plurality of conductors connected to said outputs of said encoder, whereby to constantly indicate the position of said position indicating apparatus.

5. In a display system controlled by a computer whereby the display is alterable in accordance with signals delivered to said computer which indicate positions on said display and changes desired to be made therein, the improvement in a position indicating control apparatus which is movable over a surface to provide position indications corresponding to positions on said display comprising:

a housing;

a first position wheel rotatably mounted on said housing and having a rim portion extending past the boundaries defined by said housing for supporting said housing on said surface;

a second position wheel rotatably mounted on said housing with its axis of rotation oriented perpendicular to the axis of said first wheel, said second position wheel having a rim portion extending past said housing for supporting said housing on said surface; and transducer means connected to each of said first and second wheels, for generating digital position indicating signals indicating the degree of rotation of said wheels.

6. The improvement described in claim 5 including:

coupling means for substantially unrestrained coupling of said transducer means to said computer, to couple said position indicating signals to said computer while enabling substantially unrestrained movement of said housing relative to said computer.

7. The improvement described in claim 5 including:

a flexible conductor for connecting said transducer means to said computer, to carry position indicating signals to said computer while enabling substantially unrestrained movement of said housing relative to said computer.

8. A display system for presenting an alterable visual display comprising:

cathode ray tube means for providing a visual display;

computer means connected to said cathode ray tube means for controlling inputs to said cathode ray tube means to define the visual display thereof, said computer means including means for generating signals defining a cursor for display at variable positions on said cathode ray tube means and means for altering inputs to said tube means to cause a change in the display about the position of said cursor;

a position indicator control connected to said computer means, said position indicator control having a housing which contains transducer means for delivering signals for causing movement of said cursor on said cathode ray tube means in response to movement of said housing over a surface; and at least one cathode ray tube display control switch disposed on said position indicator control.

References Cited

UNITED STATES PATENTS

| | | | |
|---|---|---|---|
| 3,304,434 | 2/1967 | Koster | 33—141.5 X |
| 3,346,853 | 10/1967 | Koster et al. | 340—324 X |
| 3,355,730 | 11/1967 | Neasham | 178—18 X |

THOMAS B. HABECKER, Primary Examiner

D. L. TRAFTON, Assistant Examiner

U.S. Cl. X.R.

33—141.5; 178—18; 345—177, 204, 212, 354